US009464413B2

(12) United States Patent
Hardison

(10) Patent No.: US 9,464,413 B2
(45) Date of Patent: Oct. 11, 2016

(54) MOORING STRUCTURE WITH HABITAT FEATURES FOR MARINE ANIMALS

(71) Applicant: Stewart Hardison, Bainbridge, NY (US)

(72) Inventor: Stewart Hardison, Bainbridge, NY (US)

(*) Notice: Subject to any disclaimer, the term of this patent is extended or adjusted under 35 U.S.C. 154(b) by 0 days.

(21) Appl. No.: 14/496,246

(22) Filed: Sep. 25, 2014

(65) Prior Publication Data

US 2015/0010362 A1    Jan. 8, 2015

Related U.S. Application Data

(60) Division of application No. 13/196,027, filed on Aug. 2, 2011, now Pat. No. 8,869,746, which is a continuation-in-part of application No. 12/462,648, filed on Aug. 6, 2009, now abandoned.

(51) Int. Cl.
| | | |
|---|---|---|
| *A01K 61/00* | (2006.01) | |
| *E02B 3/04* | (2006.01) | |
| *B63B 21/29* | (2006.01) | |
| *E02B 3/24* | (2006.01) | |
| *E03B 3/24* | (2006.01) | |

(52) U.S. Cl.
CPC .............. *E03B 3/24* (2013.01); *A01K 61/00* (2013.01); *B63B 21/29* (2013.01); *E02B 3/046* (2013.01)

(58) Field of Classification Search
CPC ...... A01K 61/006; B63B 21/24; B63B 21/26
USPC ....... 119/207, 208, 221, 223, 238, 239, 240; 43/55, 56, 103, 102, 100; 114/311, 114/297, 300, 230.26, 293, 294, 299, 295, 114/230.1, 230.28, 230.29; 405/30, 195, 31
See application file for complete search history.

(56) References Cited

U.S. PATENT DOCUMENTS

| | | |
|---|---|---|
| 954,283 A | 4/1910 | Hawkes |
| 2,032,030 A | 2/1936 | Talen |
| 3,015,299 A | 1/1962 | Towne et al. |
| 3,339,907 A | 9/1967 | Parker |
| 3,455,269 A | 7/1969 | Dean |
| 3,561,402 A | 2/1971 | Ishida et al. |

(Continued)

FOREIGN PATENT DOCUMENTS

| | | |
|---|---|---|
| DE | 3201975 A1 | 8/1983 |
| EP | 1875801 A1 | 1/2008 |

(Continued)

OTHER PUBLICATIONS

Nguyen, Office Action Communication for U.S. Appl. No. 13/196,027 dated Nov. 6, 2012, 13 pages.

(Continued)

*Primary Examiner* — Son T Nguyen
(74) *Attorney, Agent, or Firm* — Hoffman Warnick LLC

(57) ABSTRACT

A structure for underwater placement on a sea, lake or river bottom. The structure has tunnels to allow water and water currents, as well as marine organisms, to pass freely therethrough and infiltrate and colonize the openings. One or more hitch points are provided on the structure for attaching mooring lines to ships, boats, floating wind turbines or other floating objects, thereby allowing the structure to serve as a mooring to anchor such objects. The hitch points can be recessed within a depression in the surface of the structure and the hitch bar ends can also be recessed, providing an exterior surface free of protuberances.

6 Claims, 6 Drawing Sheets

(56) References Cited

U.S. PATENT DOCUMENTS

| | | | |
|---|---|---|---|
| 3,611,734 | A | 10/1971 | Mott |
| 3,741,159 | A | 6/1973 | Halaunbrenner |
| 3,799,098 | A | 3/1974 | Taylor et al. |
| 4,092,944 | A | 6/1978 | Van der Wal |
| 4,316,431 | A | 2/1982 | Kimura |
| 4,388,019 | A | 6/1983 | Kajihara |
| 4,465,399 | A | 8/1984 | Kikuzawa et al. |
| 4,508,057 | A | 4/1985 | Suzuki |
| 4,563,972 | A | 1/1986 | Poppe |
| 4,708,086 | A | 11/1987 | Brown, Jr. |
| 4,736,708 | A | 4/1988 | Yoder |
| 4,776,140 | A | 10/1988 | Wright et al. |
| 4,916,845 | A | 4/1990 | Aydelette, Sr. |
| 4,947,791 | A | 8/1990 | Laier et al. |
| 4,997,311 | A | 3/1991 | Van Doren |
| 5,215,406 | A | 6/1993 | Hudson |
| 5,454,665 | A | 10/1995 | Hughes |
| 5,803,660 | A | 9/1998 | Warren et al. |
| 5,836,265 | A | 11/1998 | Barber et al. |
| 6,186,702 | B1 | 2/2001 | Bartkowski |
| 6,276,301 | B1 | 8/2001 | Pederson |
| 6,467,993 | B1 | 10/2002 | Utter et al. |
| 6,712,024 | B1 | 3/2004 | Hall |
| 6,866,449 | B2 * | 3/2005 | Riddiough .......... E21B 41/0021 114/293 |
| 7,024,735 | B1 | 4/2006 | Huggins |
| 7,992,509 | B1 | 8/2011 | Veazey |

FOREIGN PATENT DOCUMENTS

| | | |
|---|---|---|
| GB | 2280411 A | 2/1995 |
| JP | S63287432 A | 11/1988 |
| JP | H022307 A | 1/1990 |
| JP | 03123429 A * | 5/1991 |
| JP | H03123429 A | 5/1991 |
| JP | H03228632 A | 10/1991 |
| JP | H05236844 A | 9/1993 |
| JP | H07107878 A | 4/1995 |
| JP | H07177834 A | 7/1995 |
| JP | H0813518 A | 1/1996 |
| JP | H08209655 A | 8/1996 |
| JP | H11247159 A | 9/1999 |
| JP | 2000144684 A | 5/2000 |
| JP | 2000300109 A | 10/2000 |
| JP | 2001045908 A | 2/2001 |
| JP | 2004215632 A | 8/2004 |
| JP | 2004324373 A | 11/2004 |
| JP | 2006254761 A | 9/2006 |
| JP | 2008029267 A | 2/2008 |

OTHER PUBLICATIONS

Nguyen, Notice of Allowance and Fee(s) Due for U.S. Appl. No. 13/196,027 dated Jun. 30, 2014, 10 pages.

Nguyen, Office Action Communication for U.S. Appl. No. 13/196,027 dated Jun. 1, 2012, 10 pages.

Nguyen, Office Action Communication for U.S. Appl. No. 13/196,027 dated Dec. 13, 2013, 13 pages.

* cited by examiner

MOORING STRUCTURE WITH HABITAT FEATURES FOR MARINE ANIMALS

CROSS-REFERENCE TO RELATED APPLICATIONS

This application is a divisional application of co-pending U.S. patent application Ser. No. 13/196,027, filed 2 Aug. 2011, which is a continuation-in-part of U.S. patent application Ser. No. 12/462,648, filed 6 Aug. 2009, each of which is hereby incorporated herein.

In U.S. patent application Ser. No. 12/462,648, there is defined a container for underwater placement on a sea, lake or river bottom. The container has openings in the sides, top and bottom and is filled with ballast of large boulders, cobble, crushed coral, cast concrete modules or other materials. The openings allow water and water currents, as well as marine organisms, to pass freely therethrough. Over time, a wide assortment of marine organisms infiltrate and colonize the nooks, crevices and cavities of the ballast, thus utilizing the habitat as they would an artificial reef. One or more hitch points are provided on the container for attaching mooring lines for ships, boats, floating wind turbines or other floating structures, thereby allowing the artificial reef to anchor such structures.

FIELD OF THE INVENTION

The invention relates to mooring devices and, more particularly, to a specialized mooring system that provides habitat that is attractive to a wide variety of underwater organisms.

BACKGROUND OF THE INVENTION

Artificial reefs are commonly found around the world. Some are constructed to protect harbors or beaches from wind, wave or tidal forces. These types of reefs are often constructed of large, boulder-sized stones or concrete modules cast in a variety of shapes and sizes.

Reefs designed for protection purposes generally extend above the water line so as to deflect the forces of wind, wave or tide. These protective artificial reefs can be of any size or shape; sometimes they are circular, semi-circular, curved or straight. When a reef is constructed to abut a shoreline, it is sometimes called a break wall. When a reef extends from the shoreline into open water, it is sometimes called a jetty. Whatever they are called, they are, in essence, an artificial reef.

Artificial reefs are often favored by fishermen, because their structure, whether constructed of natural stone or concrete modules, creates prime shelter and habitat for a wide variety of marine organisms, including desirable species such as fish, crab and lobster that are prized by both commercial fishermen and recreational sports fishermen.

Other artificial reefs are constructed solely to enhance marine habitat and are designed to provide an underwater landscape replete with nooks, crannies, cavities, ledges and other subsurface features onto and into which marine organisms may attach or shelter. By providing cover and sanctuary for small organisms like algae, plankton and minnows, larger fish are attracted to forage. These fish, in turn, attract even larger fish, including sharks, tuna, bass, snapper, grouper and other large predatory fish which are at the top of the marine food chain. These types of reefs are usually totally submerged and may be constructed in shallow water near shore or in deep water miles off shore.

These types of reefs may be constructed of almost any material or objects which will sink into the water column, including, but not limited to the following: natural stone, weighted tree stumps and brush, household appliances, cars, trucks, farm implements, school buses, scrap steel, subway and railway cars, factory machinery and other. Additionally, any number of decommissioned naval and merchant ships of all sizes have been scuttled in deep water to provide artificial reef structure. These types of reefs may also be constructed of cast concrete modules that can take a variety of shapes and which may have cavities molded into them.

Increasingly, artificial reefs are becoming a part of the underwater landscape wherever there is a robust interest in fishing, either for commercial or recreational purposes, or both. As an example, many U. S. states with salt water territories actively construct artificial reefs for use by recreational sports fishermen. The reef locations appear on nautical charts, and buoys are positioned over them so they may be easily located by mariners and fishermen. Certain countries, notably Japan, construct artificial reefs on a large scale for use by their commercial fishing fleets. Wherever artificial reefs are constructed, they are widely considered to be an enhancement to the marine environment and ecosystem.

DISCUSSION OF THE RELATED ART

A number of prior patents disclose artificial reefs specifically to attract and concentrate marine organisms. As an example, U.S. Pat. No. 4,947,791 to Laier et al. discloses an artificial reef for marine life consisting of a system of flexible, buoyant geometric bodies. The bodies are each walled members formed of a plastics material and having a large plurality of holes or openings therein. Each of the bodies is buoyant and is anchored on the sea floor via respective variable length cable so that the bodies float within the water at various elevations. The bodies may be formed of the same size and shape or different sizes and shapes, with the openings therein also being of the same shape or different shapes and sizes. In certain embodiments the bodies are telescoped within each other, and in other embodiments the bodies are interconnected together in a manner such that their axes are in a nonparallel relationship to each other.

U.S. Pat. No. 4,465,399 to Kikuzawa et al. discloses an artificial reef assembly construction which comprises, in combination, an artificial reef assembly comprising a plurality of reef units each comprising a hollow structure and a predetermined number of floaters, each floater comprising a body casing having an inner chamber partitioned so as to be fluid tight by means of at least one partition wall to have a plurality of air chambers, the floaters being releasably secured into the hollow structures of reef units, at least one of the plurality of air chambers having at least one openable portion. The artificial reef assembly construction with its floaters filled with air can be floated on the surface of the sea and towed to a desired location, where by only opening at least one openable portion of at least one of the air chambers the artificial reef assembly can be easily submerged while causing the floaters to be automatically released from the artificial reef assembly. The released floaters are left afloat on the surface of the sea and, hence, they can be easily recovered.

U.S. Pat. No. 4,388,019 to Kajihara discloses an artificial reef assembly construction which comprises an artificial reef assembly comprising a plurality of artificial reef units and a predetermined number of rods each having an engaging means, said rods being disposed on the artificial reef assembly at its both side walls and firmly secured to the reef units of the side walls, is easy and simple to move or transport by hoisting and lowering it by means of the hoisting member of crane or the like through the medium of said engaging means of the rods attached to the artificial reef assembly.

The above-identified patents disclose cylindrical structures that are open on the ends and essentially porous on the sides. The porosity of the sides allows small fish and other organisms, as well as ambient water currents, to pass freely through the sides. The interior spaces of the structures provide sanctuary to small fish and other organisms, while limiting access to larger, predatory fish. In each of the patents, the disclosed structures can be utilized individually or in plurality. The device disclosed by Laier et al. is buoyant, and therefore suspends off the marine ground and is held in place by a tether line attached to an anchor. The reefs taught by Kikuzawa and Kajihara are of sufficient density that they sink through the water column and rest on the bottom without the need of an anchor or retaining stake.

U.S. Pat. No. 6,276,301 to Pederson discloses a fish habitat package built up of old tire casings baled together to form a series of chambers into which fish can enter to provide habitat for those fish.

U.S. Pat. No. 6,712,024 to Hall discloses an artificial reef system having a plurality of tire casings tethered onto a cable-like line which reef system is supported in an upright position by a flotation device and which artificial reef system is anchored to the bottom of the ocean by another tire casing filled with concrete having an anchoring device disposed on its underside. The cable-like line may be monofilament. The reef system of tire casings is disposed upwardly due to the buoyancy of the flotation device and is free to move with the current in a natural manner to the extent that the cable-like allows. The flotation device may have a rigid wall so that it maintains its surface displacement when subjected to underwater pressure.

The above-identified patents disclose an apparatus utilizing tire casings for the construction of artificial reefs. The Pederson device shows a habitat structure comprising tire casings baled together to form a series of chambers and cavities in which fish and other organisms can find refuge. The density of the tire casings allows them to rest on the bottom without anchorage assist. Hall shows a string of tire casings linked together and suspended vertically in the water column, with the top end attached to a flotation device and the lower end attached to anchor means.

U.S. Pat. No. 5,454,665 to Hughes discloses an artificial reef for use in a body of water to provide a habitat for aquatic life. The reef is formed by providing an anchoring structure that is submerged in the body of water. The anchoring structure has a weight sufficient to anchor the artificial reef to the floor of the body of water. Spaced at intervals along the floor of the body of water and attached to the anchoring structure are a plurality of reef assemblies. Each of the reef assemblies is formed from a base that is secured to the anchoring structure. A flexible elastomeric sleeve is coupled to a lower end of a buoyant, elongated member formed from a substantially rigid polymeric material so that the elongated members are held in a general upright position. By providing a plurality of these reef assemblies, an artificial reef is formed. The elastomeric element of the reef assemblies allows the elongated members to pivot relative to their bases at the elastomeric element so that passing fishing nets or other objects deflect the elongated members of the artificial reef. The artificial reef is restored to its original state after the object has passed by.

U.S. Pat. No. 6,467,993 to Utter et al. discloses an artificial reef comprising a string of open bodies, a floatation device and an anchoring device.

The above-identified patents disclose artificial reef components comprising vertical, pole-like structures that extend upward from the marine bottom into the water column. Each device is designed to function with other, like units. The Hughes structure comprises a buoyant rod attached flexibly to an anchor base; Utter shows a string of multi-chambered bodies sharing a cable line, with one end of the cable attached to a flotation device and the opposing end attached to an anchor. Each structure has the ability to heel over, or sway, in response to tidal currents or wave impacts.

U.S. Pat. No. 4,916,845 to Aydelette, Sr. for DEVICE TO ATTRACT FISH discloses an apparatus for attracting fish in fresh water lakes and ponds. The apparatus comprises a buoyant disk that is attached to and floats above a tubular, transparent container that is anchored, or ballasted, with stones. The container is used to confine minnows, which are visible to wild fish that may swim in the vicinity. Upon seeing the minnows, the wild fish are lured closer to the container, thereby providing an advantage to the angler who lowers a baited hook near or adjacent to the container. As a means to further assist the angler, the outer edge of the buoyant disk is serrated, thus providing a series of niches to help maintain the angler's fishing line and bait in close proximity to the container and the wild fish that are lured to it.

Aydelette, Sr. is essentially a cage that confines and holds minnows. The minnows are trapped and held inside the container, with no means of escape. The device is designed to securely enclose, trap, cage or otherwise confine and hold the minnows on the inside of the container.

The apertures shown in Aydelette, Sr. are uniform in size. Although no dimensions are given for the apertures, they obviously must be no greater than one inch in diameter, as anything greater than one inch in diameter would allow even a large minnow (one measuring five to six inches in length) to swim freely out the hole and escape the container, thereby defeating the purpose of the device.

U.S. Published patent application Ser. No. 12/462,648 to Hardison for MOORING HABITAT STRUCTURE shows a ballast filled container for underwater placement on a sea, lake or river bottom. The container has openings in the sides, top and bottom and is filled with ballast of large boulders or other materials. The openings allow water currents, as well as marine organisms, to pass freely therethrough. Over time, marine organisms colonize the cavity areas of the ballast, thus utilizing the habitat within the container as an artificial reef. One or more hitch points are provided on the container for attaching mooring lines, thereby allowing the container to serve as an anchor for boats, ships, aquaculture systems, wind turbines, rigs and other floating apparatus.

One embodiment of Hardison shows variable sized ballast arranged in strata, with strata in registry with variable sized openings. Another embodiment shows a central silo, absent strata but retaining openings, positioned centrally in the container.

All the above cited patents share the common feature of providing structure to serve as sanctuary, refuge and attachment surface for marine organisms ranging from algae to crabs and lobsters and finned fishes. While a number of the above cited patents employ means to hold them in place on the marine bottom, none of the above patents, except the one described by Hardison, functions as an anchor for mooring floating vessels or structures. In summary, none of the above artificial reefs, except the one described Hardison, can in any respect serve the function of an anchor for anything but itself.

The word anchor means cover a wide variety of sizes, shapes and designs, but may generally be assigned to two broad categories: stationary anchor means which remain in one position on the sea, harbor, river or lake bottom; and portable anchor means which are carried aboard vessels, large or small, and which are lowered into water whenever anchorage is needed and then hoisted back aboard when the vessel needs to continue passage.

Stationary anchor means are sometimes massive concrete or steel structures, which rely on gross deadweight tonnage to hold them in place. Generally, a stout cable, chain or hawse line runs from this large, submerged anchor to a buoy that floats on the surface of the water. This buoy has stanchions, or stout chain rings, onto which boats or ships may tie their mooring lines. Other stationary mooring anchors are steel, concrete or wooden devices that are driven or buried deep into the sea, harbor, river or lake bed, with a heavy line running from them to a surface mooring buoy or fixed structure.

As an example, U.S. Pat. No. 3,611,734 to Mott discloses a separable component foundation anchor adapted for positioning an offshore floating platform or other floatable vessel at a desired deep water well drilling site. The anchor includes a relatively heavy pilot member and a submergible casing or ballast section. The anchor further includes means to engage the lower end of the offshore platform to minimize movement of the latter at the water's surface. The ballast section cooperates with the pilot member, functioning sequentially as a transport means to the offshore site, and after being ballasted and submerged supplements the weighted pilot section. Said ballast section further may hold a quantity of fluids used in an oil drilling or producing operation such as drilling mud, crude oil and the like whereby to minimize the need for additional platform space to store such materials.

Mott discloses floatable components comprising a rectangular foundation member and ballast. The members are towed to an offshore location, where the foundation member is submerged by the flooding of interior chambers. Once the foundation member is resting on the marine bottom, the ballast is flooded to force it to sink onto the foundation member, thereby unitizing the individual members into an anchorage foundation for the submerged legs of an oil drilling platform.

U.S. Pat. No. 4,092,944 to Van der Wal discloses an underwater anchor for keeping floating structures in position in oceans or other waters has at least one oblong cylindrical hollow body constructed in such a manner that it can withstand the external water pressure at the depth at which it is used. The body has a positive floating power when its interior is almost entirely filled with air. One or more fastening points for anchor cables are located on the body and it may have one or more connections for adding ballast to the interior of the body.

Van der Wal discloses an anchor comprising two oblong, cylindrical, hollow bodies joined by a series of spars. When the hollow chambers are flooded with water, they sink to the bottom, where they can be buried or driven into the underwater bed or floor to form an anchor for large vessels or floating structures.

U.S. Pat. No. 4,776,140 to Wight et al. discloses an anchor for supporting guy wires for transmission towers and other structures. The anchor includes a cradle or base skid that supports a plurality of modular deadweight bodies that may interlock to increase the overall stability of the anchor.

Wight et al. discloses a modular block anchor for supporting guy wires for transmission towers and other land-based structures. The anchor comprises a cradle, or base skid, onto which are stacked deadweight blocks. Individually, the blocks are transportable by helicopter, but when assembled on the base skid they cumulatively can weigh dozens of tons. While designed for land use, the Wight et al. device could be used in underwater applications.

Portable anchors, which are carried aboard vessels, are generally lighter in weight. As an example, German document DE 3201975 shows a basket apparatus that, when filled with stones, serves as an anchor for ships. The basket apparatus has a pull chain that allows the ballast stones to be dumped. Once emptied, the basket is then collapsible for efficient storage on board the ship.

More specifically, German document DE 3201975 shows a four sided, pyramidal-shaped basket comprising movable sidewalls. The sidewalls are operative in their movement as result of their lower edge being hinged to a bottom, or floor plate. This allows the sidewalls to swing outward or inward in the manner of a hinged door.

German document DE 3201975 shows no internal members or struts connecting fixedly to the respective sidewalls, as such internal structural features would prohibit the movement of the sidewalls, thereby defeating the purpose of the apparatus.

Other portable anchors derive their holding power from tongs, or flukes, which engage the bottom when the anchor is dragged across the floor of the water body on which the vessel floats. These drag embedded anchors generally require long mooring lines to function effectively. As an example, U.S. Pat. No. 3,015,299 to Towne et al. discloses a classic drag embedded anchor, with the anchor comprising two large steel flukes hinged on a cross bar attached to a steel arm with a hitch point on the distal end of the arm for attaching a heavy chain or hawse line.

The above described permanent and portable devices may inadvertently attract marine organisms, as will virtually any object that resides on submerged ground in either freshwater or salt water environment. As an example, it is commonly known that offshore oil platforms in the Gulf of Mexico are attractive to a wide variety of game fish prized by fishermen. Similarly, bridge or dock pilings in freshwater lakes or rivers attract a variety of minnows and pan fish, which in turn attract predatory game fish like bass and pike. While it is well known that such structures attract marine organisms, the underwater components of these structures are not in any sense a "reef," as they do not have the requisite components of piled rocks, boulders, gravel, concrete modules or crushed coral which create myriad nooks, crannies, ledges, crevices and cavities which both natural and artificial reefs present. It is these said features that attract marine organisms in the greatest variety and quantity of numbers.

SUMMARY OF THE INVENTION

The invention provides a habitat structure for underwater placement on a sea, lake or river bottom. A series of parallel tunnels extend through the structure. The tunnels allow water currents, as well as marine organisms, to pass freely there through. Over time, marine organisms colonize the tunnels, thus utilizing the structure as an artificial reef. One or more hitch points are provided on the habitat structure for attaching mooring lines.

As will be seen, one general object of the invention is to provide a mooring habitat structure for mooring boats, ships, aquaculture systems, wind turbines, rigs and other floating apparatus.

Another object of the invention is to provide a mooring habitat structure having a removable hitch bar, negating a need for a shackling device concomitant to mooring structure and allowing the replacement, if needed, of the hitch bar.

Still another object of the invention is to provide a mooring habitat structure that has more than one habitat zone for marine life, thus providing a structure that promotes diversity as well as aggregation of marine life.

A further object of the invention is to provide a mooring habitat structure that is free of protruding elements that might entangle a mooring chain, or any other lines that might inadvertently come in contact with the mooring habitat structure, including lobster pot tether lines or fishing trawl lines.

Still another object of the invention is to provide at least one hitch point that is easily replaceable and removable, thus facilitating the attachment of a mooring chain and eventual replacement of the hitch point when it needs to be replaced with a new one.

One of the primary attending objects of the invention is to provide a mooring habitat structure that is fashioned in such a way that it provides one or more secure hitching points for one or more anchor lines from which to moor boats, ships, barges or other floating structures, including floating wind turbines. It should be noted that the invention is especially suited for the mooring of aquaculture net pens, as well as for the mooring of floating wind turbines whenever they are arranged in a plurality of units, or in what is commonly called an off shore wind farm.

BRIEF DESCRIPTION OF THE DRAWINGS

A complete understanding of the present invention may be obtained by reference to the accompanying drawings, when considered in conjunction with the subsequent, detailed description, in which.

DETAILED DESCRIPTION OF THE PREFERRED EMBODIMENT

Figure 1:
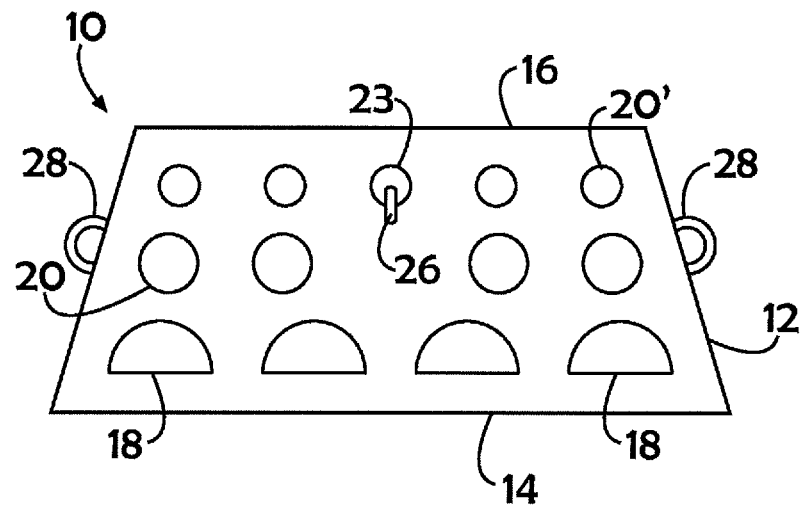
FIG. 1 is a side view of one embodiment of the invention.

The invention provides an underwater mooring structure. A series of tunnels extend through the structure body. The tunnels allow water currents, as well as marine organisms, to pass freely therethrough. Over time, marine organisms colonize the cavity spaces inside the tunnels, thus utilizing the mooring structure as an artificial reef. One or more hitch points are provided on the structure for attaching mooring lines, thereby allowing the structure to serve as an anchor. The hitch points and the hitch bar ends may be recessed within depressions in the surface, giving an exterior surface free of potential snag points.

Referring now to FIGS. 1 through 6, the mooring structure 10 consists of a concrete mass with a sidewall 12, a bottom 14 and a top 16. A plurality of tunnels comprising half round tunnel 18 and round tunnel 20 and 20' extend through the mooring structure 10. A depression or void area 24 is recessed into top 16. A hitch rod 26 extends horizontally through round tunnel 23 and 23' and thence through void area 24. Hitch ring 28, in plurality, is embedded in sidewall 12.

Figure 2:
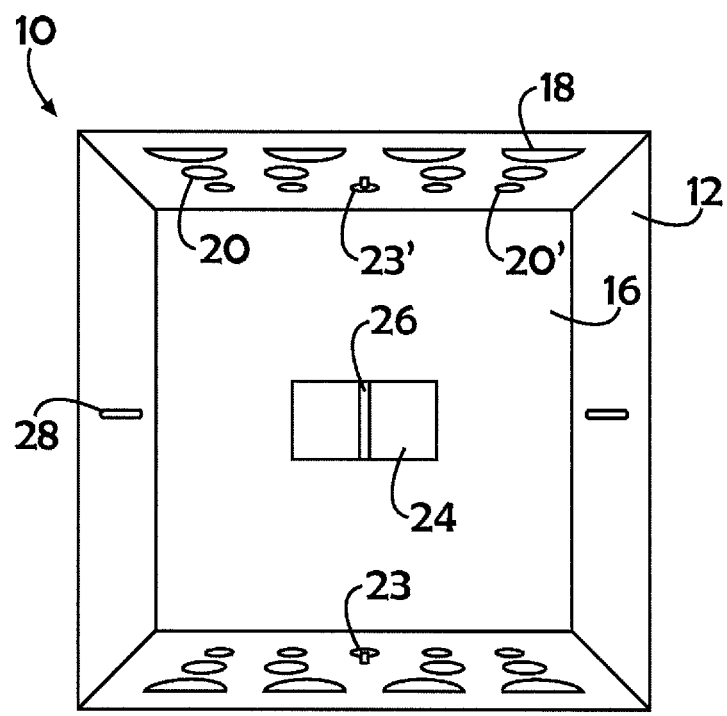
FIG. 2 is a top view of one embodiment of the invention.

As best seen in FIGS. 1 and 2, mooring structure 10 is pyramidal in form. While a pyramidal structure has certain advantages relating to strength and stability, mooring structure 10 could also be square or any other closed geometric shape, including, but not limited to, rectangle, octagonal, hexagonal, pentagonal, triangular or polygon. The number of hitch rings 28 is also arbitrary, and could be any number.

Mooring structure 10 is constructed primarily of cast concrete, but other materials could be used, including, but not limited to, stone, steel, composite plastic or any combination thereof. Although the preferred embodiment is shown as a pyramid, other three dimensional forms could also be used, including cube, cylinder, cone, sphere and polygon.

Figure 3:
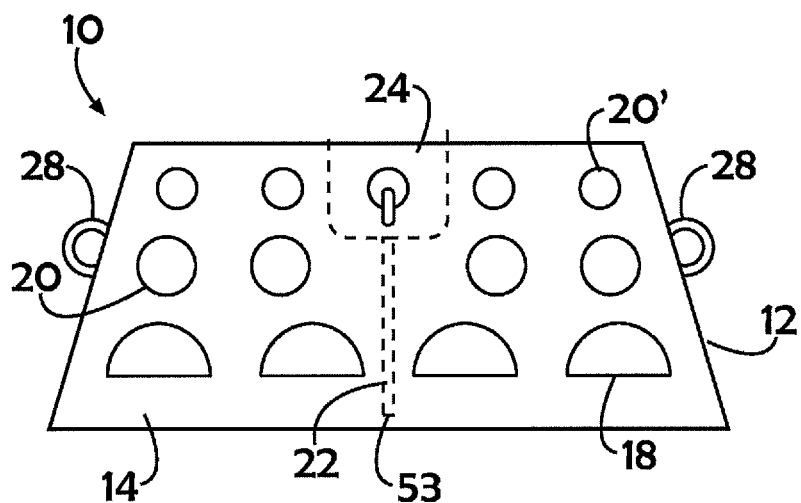
FIG. 3 is section view of one embodiment of the invention, showing void area and drain channel therein.
Figure 6:
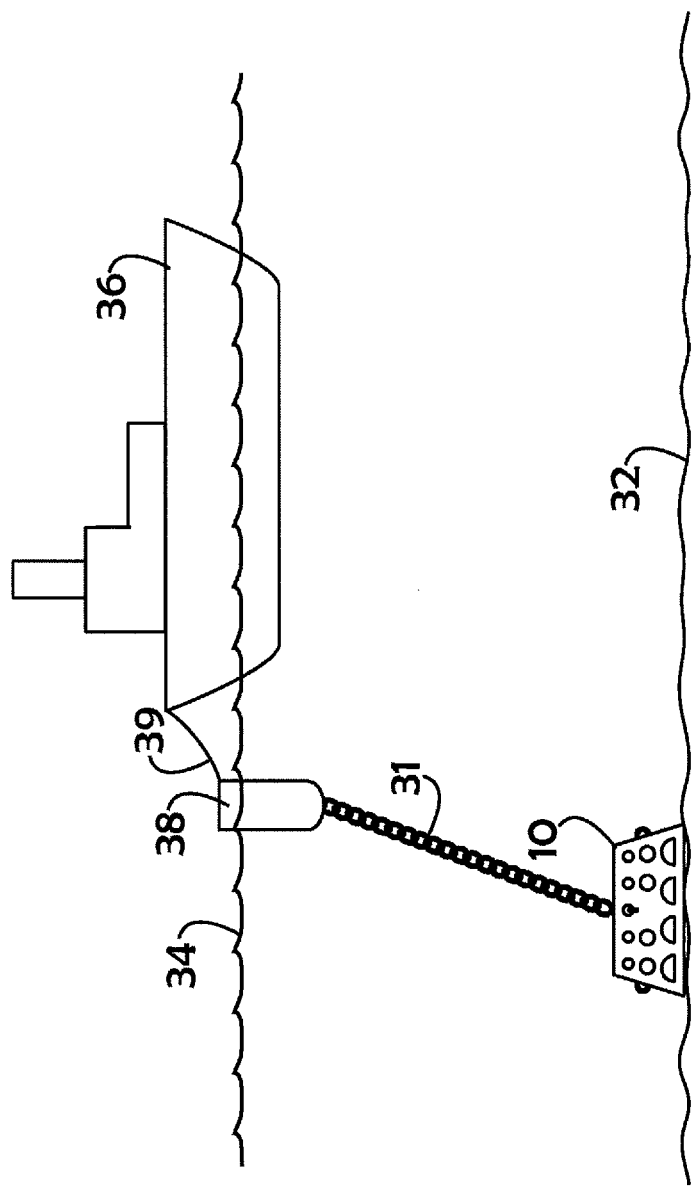
FIG. 6 is a conceptual view of a preferred embodiment of invention showing a generic mooring application.

As best seen in FIGS. 1, 3 and 6, tunnel 18 is half round, while tunnel 20 and 20' are full round, but they could also be of other geometric form, including oblong, rectangle, polygon and irregular. Also, while the row comprising tunnel 18 is shown below the rows comprising tunnel 20 and 20', the positioning of the rows is arbitrary and could, in fact, be arranged in other patterns. However, it should be noted that by positioning tunnel 18 in close proximity to the bottom bed, or marine ground 32, it is made easier for crabs, lobsters and other ground-based marine life (not shown) to infiltrate the tunnel and find shelter there. It should be further noted that marine research has discovered that adult lobsters actively seek and depend upon shelter cavities found under and amongst rocks and other subsurface features and, moreover, show preference for cavities that are relatively flat bottomed with a cavity space that is wider than it is high. Half round tunnel 18 is thus fashioned to specifically address this discovery. And while a half round tunnel 18 is shown in the preferred embodiment, a rectangular shaped tunnel could also serve to provide a flat bottomed cavity that is wider than it is high.

While proximity of half round tunnel 18 to marine ground 32 encourages the aggregation of lobsters, the size of half round tunnel 18 is also important. Therefore, in order to attract and accommodate adult lobsters, crabs and other marine animals, half round tunnel 18 comprises a dimension that usually measures between 4 inches and 12 inches in width and between 2 inches and 6 inches in height. This size opening allows mature lobsters and crabs to infiltrate the tunnel and find shelter in the cavity. At the same time, an opening that is within the range cited above prevents large cod and other predatory fish from entering the tunnel and preying upon the lobsters, crabs and other species that may reside in the habitat formed by half round tunnel 18.

As best seen in FIGS. 1 and 3, round tunnel 20 and 20' are positioned higher on sidewall 12 of mooring structure 10 than is half round tunnel 18. This allows larval lobsters, minnows and other small organisms to settle into the shelter cavities provided by round tunnel 20 and 20'.

In order to accommodate larval lobsters and crabs, minnow sized fish and other small organisms, round tunnel 20' measures between approximately 2 inches and 4 inches in diameter. In order to accommodate lager species—for example, juvenile to adult lobsters—round tunnel 20 can measure between approximately 4 inches and 12 inches in diameter.

As best seen in FIGS. 3, 4, 5a through 5d, mooring structure 10 retains a void area 24 that is intersected by round tunnel 23 and 23'. A hitch rod 26 extends through round tunnel 23 and 23' and thence through void area 24.

Figure 5A:
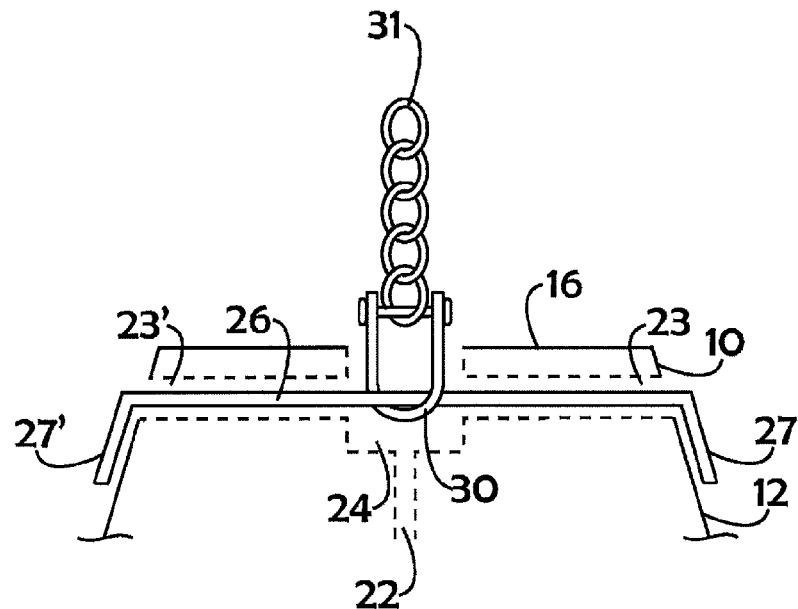
FIG. 5*a* is a section view detail of a preferred embodiment of the invention, showing hitch system components.

As best seen in FIG. 5a, the opposing ends 27 and 27' of hitch rod 26 are bent downwards to an angle that approximates the slope of sidewall 12. Because the lengths of opposing ends 27 and 27' of hitch rod 26 are greater than the diameter of round tunnels 23 and 23', hitch rod 26 is effectively locked in place within confines of round tunnels 23 and 23' and void area 24. This allows hitch rod 26 to serve as a fixed hitch point for shackle 30 and mooring chain 31.

Figure 5B:
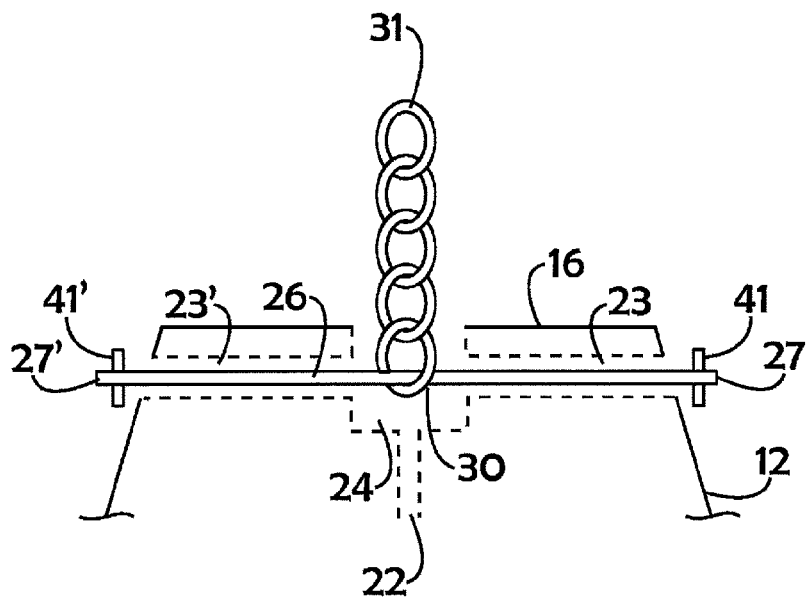
FIG. 5*b* is a section view detail of a preferred embodiment of the invention, showing alternate hitch system components.

As best seen in FIG. 5b, the opposing ends 27 and 27' of hitch rod 26 may remain straight, with stop means 41 and 41' attached fixedly thereon. Because the lengths of stop means 41 and 41' are greater than the diameter of round tunnels 23 and 23', hitch rod 26 is effectively locked in place within confines of round tunnels 23 and 23' and void area 24. As shown, stop means 41 and 41' are inserted into holes (not shown) located near opposing ends 27 and 27' of hitch rod 26. Stop means 41 and 41' may be fixedly retained therein by friction fit, or they may be anchored fixedly in place by weldments. Though not shown, it is obvious that stop means 41 and 41 could also comprise a standard bolt and nut made of metal or plastic, as well as any number of other pins or loops that are readily available at retail and which can be readily inserted through the through holes (not shown) in opposing end 27 and 27' of hitch rod 26. Though not shown, it is also obvious that opposing ends 27 and 27' of hitch rod 26 could be machined to retain screw threads, onto which a sizable bolt could be threaded, thereby creating an effective stop means and thus anchoring hitch rod 26 fixedly in place.

As shown in FIG. 5b, hitch rod 26 is inserted directly through chain 31, thus eliminating the need for shackle 30, as shown in FIG. 5a. This is a cost benefit to the user of habitat mooring 12. The elimination of shackle 30 also has function benefits, because it eliminates a piece of hardware that could potentially fail under the stress of mooring vessels.

Figure 5C:
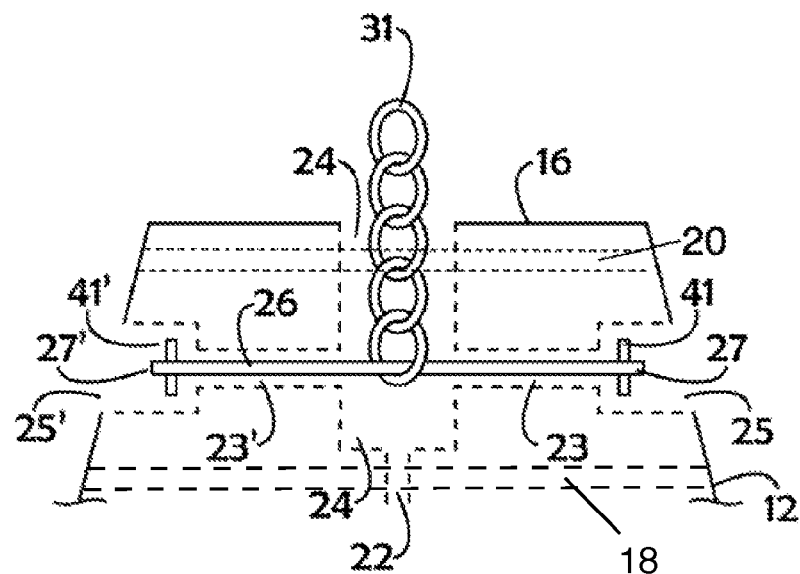
FIG. 5*c* is a section view detail of a preferred embodiment of the invention, showing alternate hitch system configuration.

As seen in FIG. 5c, habitat mooring structure 10 may also have recessed side pockets 25, 25' that connect with round tunnels 23, 23'. This allows opposing ends 27, 27' of hitch rod 26 to remain inside the surface plane of sidewall 12, so that when stop means 41, 41' are inserted through hitch rod 26, neither opposing ends 27, 27' or stop means 41, 41' protrude beyond the surface plane of sidewall 12. With the opposing ends 27, 27' and stop means 41, 41' thus recessed, sidewall 12 is free of any protruding elements that might entangle a mooring chain, or other line that may inadvertently come in contact with habitat mooring structure 10, including lobster pot tether lines or fishing trawl lines.

Figure 5D:
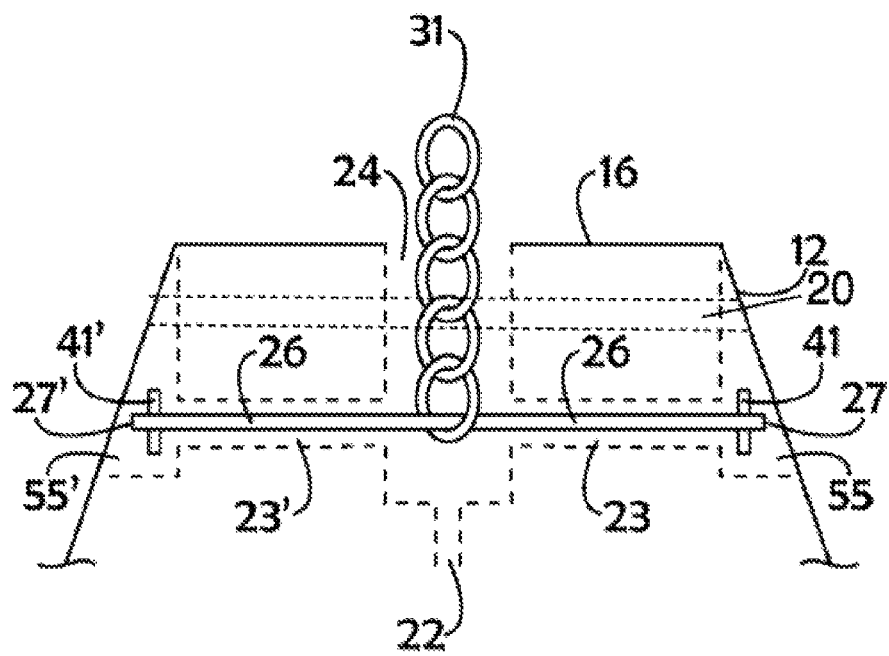
FIG. 5*d* is a section view detail of a preferred embodiment of the invention, showing alternate hitch system configuration.

As seen in FIG. 5d, habitat mooring structure 10 may also have cavity areas 55, 55' that connect with round tunnels 23, 23'. This also allows opposing ends 27, 27' of hitch rod 26 to remain inside the surface plane of sidewall 12, so that when stop means 41, 41' are inserted through hitch rod 26, neither opposing ends 27, 27' or stop means 41, 41' protrude beyond the surface plane of sidewall 12.

Figure 5E:
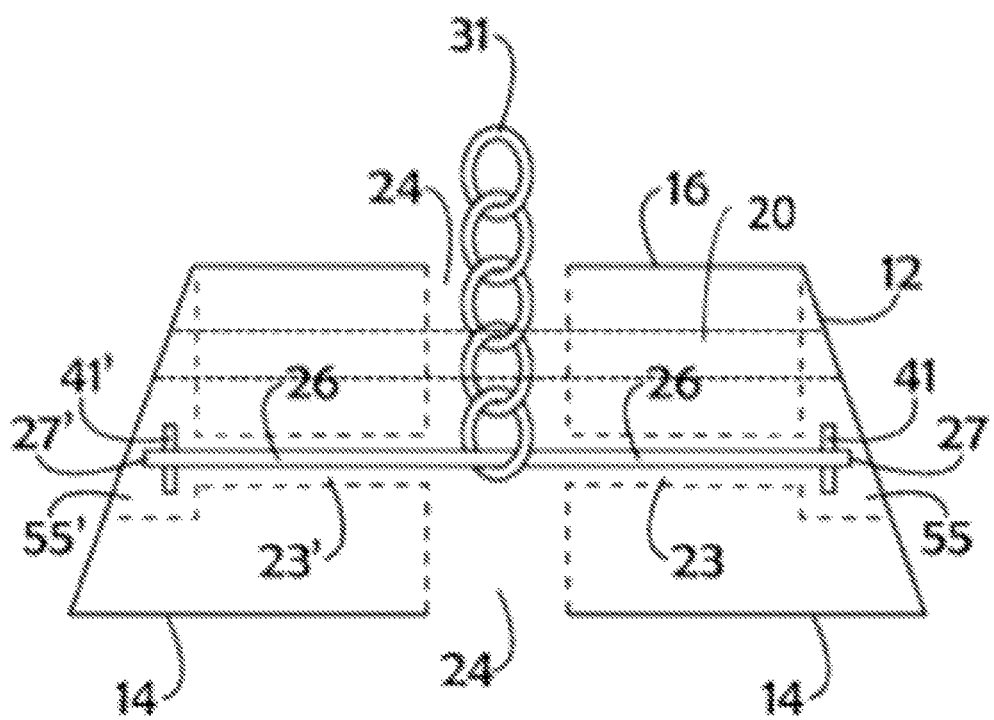
FIG. 5*e* is a section view detail of a preferred embodiment of the invention, showing alternate hitch system configuration.

As seen in FIG. 5e, habitat mooring structure 10 may have shortened sidewalls 12, thereby allowing void area 24 to extend all the way through habitat mooring structure 10, or from top 16 to bottom 14. This allows mooring habitat structure 10 to provide a lower profile, or height, while still retaining all the hitch functions described above. A low profile mooring is desirable in shallow water areas where boats need to be moored safely.

Figure 4:
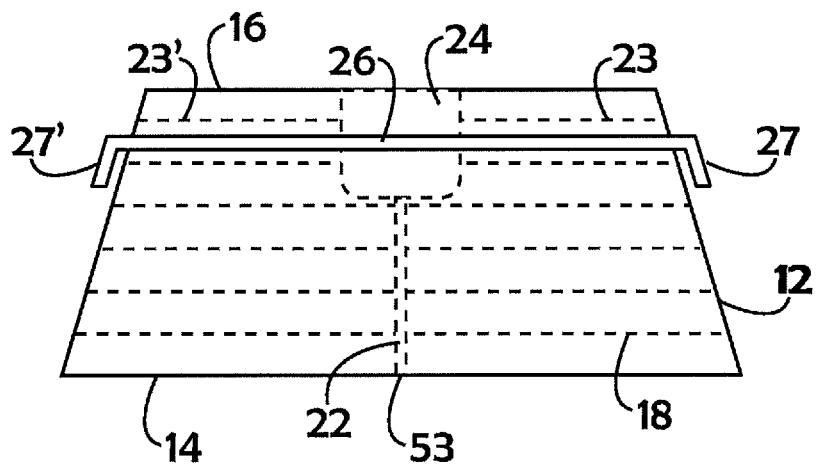
FIG. 4 is a section view of one embodiment of the invention, showing tunnels, void area and drain channel therein.

As best seen in FIGS. 3 and 4, a drain channel 22 extends from the bottom of void area 24 through the center of mooring structure 10 to an exit hole 53 in the bottom 14 of mooring structure 10. This allows rainwater to drain out of void area 24 prior to deployment, when mooring structure 10 may be stored at an outside area at the fabrication yard.

As seen in FIG. 6, when mooring structure 10 is lowered to marine ground 32, it then serves as an anchorage from which a mooring chain 31 can extend to a mooring buoy 38. A mooring line 39 can then extend from mooring buoy 38 to a vessel 36 floating on water surface 34, thus securely anchoring the vessel thereon.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this inventive method.

Having described the invention, what is desired to be protected by Letters Patent is presented in the subsequent appended claims.

What is claimed is:

1. A habitat mooring structure for securing at least one mooring line to floating structures while simultaneously providing habitat for underwater organisms, comprising:
   (a) a mass having a top, sloped side walls, and a bottom, and having a specific gravity greater than that of water;
   (b) a depression formed in said top of said mass, said depression extending from the top of the mass partially through the mass towards the bottom of the mass;
   (c) a plurality of tunnels;
   (d) one of said tunnels extending through said mass, from one of said sloped side walls to the opposing sloped side wall, and through said depression;
   (e) cavity areas or recessed side pockets in the opposing sloped side walls indirectly connected to said depression by said one of said tunnels;
   (f) a rectilinear rod, which provides a hitch point for connecting said mooring lines, extending through and removably disposed within said one of said tunnels and thence through said depression, the length of said rectilinear rod exceeding the length of said one of said tunnels, the ends of said rectilinear rod being within said cavity areas and thus inside the surface planes of the opposing sloped side walls;
   (g) stop means attached to said ends of said rectilinear rod, said stop means being within the cavity areas or recessed side pockets and thus inside the surface planes of the opposing sloped side walls; and
   (h) a drain channel extending from the bottom of the depression through the bottom of the mass,
   wherein the exterior surfaces of the structure are free of protruding elements that might entangle a mooring chain or other line.

2. The habitat mooring structure of claim 1, wherein said mass comprises a structural shape chosen from the group: pyrimidal, square, rectangle, octagonal, hexagonal, pentagonal, triangular, and other polygonal.

3. The habitat mooring structure of claim 2, wherein said mass is pyramidal.

4. The habitat mooring structure of claim 3, comprising one or more flat bottomed tunnels and one or more round tunnels.

5. The habitat mooring structure of claim 3, wherein said mass is cast concrete.

6. The habitat mooring structure of claim 1, comprising one or more flat bottomed tunnels and one or more round tunnels.

\* \* \* \* \*